(12) United States Patent
Akahoshi et al.

(10) Patent No.: US 7,522,788 B2
(45) Date of Patent: Apr. 21, 2009

(54) OPTICAL MODULE AND METHOD OF MANUFACTURING THE SAME

(75) Inventors: Tomoyuki Akahoshi, Kawasaki (JP); Akio Sugama, Kawasaki (JP); Shigenori Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/971,513

(22) Filed: Jan. 9, 2008

(65) Prior Publication Data

US 2008/0166086 A1    Jul. 10, 2008

(30) Foreign Application Priority Data

Jan. 9, 2007   (JP) ............................. 2007-001330

(51) Int. Cl.
*G02B 6/12* (2006.01)

(52) U.S. Cl. ........................................ 385/14; 385/129

(58) Field of Classification Search .................. 385/14, 385/129
See application file for complete search history.

(56) References Cited

U.S. PATENT DOCUMENTS

| 6,504,966 B2 | 1/2003 | Kato et al. |
| 6,640,032 B2 * | 10/2003 | Kondo et al. .................. 385/51 |
| 7,097,366 B2 * | 8/2006 | Aoki et al. ..................... 385/92 |

\* cited by examiner

*Primary Examiner*—Jennifer Doan
(74) *Attorney, Agent, or Firm*—Westerman, Hattori, Daniels & Adrian, LLP.

(57) ABSTRACT

An optical module with a plurality of optical waveguide substrates having element mounting openings and end surfaces which are adhered to each other with an optical adhesive; and a plurality of light deflecting element arrays mounted to the respective element mounting openings of the plurality of optical waveguide substrates, the plurality of light deflecting element arrays including a plurality of light deflecting elements.

20 Claims, 8 Drawing Sheets

OPTICAL MODULE AND METHOD OF MANUFACTURING THE SAME

CROSS REFERENCES TO RELATED APPLICATIONS

The application is based upon and claims the benefit of priority from the prior Japanese Patent Application No. 2007-001330, filed on Jan. 9, 2007, the entire contents of which are incorporated herein by reference.

TECHNICAL FIELD

The present invention relates to an optical module, used in, for example, optical communication, and a method of manufacturing the same.

BACKGROUND

In recent years, an optical switch module, using a light deflecting element having an electro-optical effect, has been proposed (for example, refer to the U.S. Pat. No. 6,504,966).

Such an optical switch module has the following structure. As shown in, for example, FIGS. 1A and 1B, in the optical switch module, light deflecting elements 101 and 102, formed of electro-optical materials (for example, electro-optical crystals, such as PZT or PLZT), are mounted onto a slab optical waveguide substrate unit 100.

That is, as shown in, for example, FIGS. 1A and 1B, the slab optical waveguide substrate unit 100 has integrally formed, input channel optical waveguides (input channel optical waveguide array) 103 to which a light signal is input, collimator lenses (input-side lens array) 104 that convert the input light signal into parallel light (collimated light), a slab optical waveguide 105 that allows the light signal converted into the parallel light to propagate therethrough, light-converging lenses (output-side lens array) 106 that converge the light signal (propagating parallel light), and output channel optical waveguides (output channel optical waveguide array) 107 to which the light signal is output. A first light-deflecting element mounting opening 112, to which the light deflecting elements 101 are mounted, and a second light-deflecting element mounting opening 113, to which the light deflecting elements 102 are mounted, are formed in the slab optical waveguide array substrate unit 100. In FIG. 1B, reference numeral 111 denotes a core layer, reference numeral 114 denotes a lower clad layer, and reference numeral 115 denotes an upper clad layer.

The input-side light deflecting elements (first light-deflecting element array) 101 and the output-side light deflecting elements (second light-deflecting element array) 102 are formed by forming thin-film slab optical waveguides 109, formed of electro-optical materials (for example, electro-optical crystals, such as PZT or PLZT), onto respective conductive substrate units 108; by forming prism electrodes 110 on a surface of each slab optical waveguide 109; and by polishing end surfaces.

In the optical switch module, the input-side light deflecting elements 101 are mounted to the first light-deflecting element mounting opening 112 disposed between the collimator lenses 104 and the slab optical waveguide 105 at the slab optical waveguide substrate unit 100. The output-side light deflecting elements 102 are mounted to the second light-deflecting element mounting opening 113 disposed between the slab optical waveguide 105 and the light-converging lenses 106.

In the optical switch module having such a structure, application of a predetermined voltage to the prism electrodes 110 (formed at the input-side light deflecting elements 101 and the output-side light deflecting elements 102) results in the following. For example, as shown in FIG. 1A, light signals, input from the input channel optical waveguides 103 and converted into parallel lights by the collimator lenses 104, are deflected by the input-side light deflecting elements 101, propagate through the slab optical waveguide 105, are deflected again by the output-side light deflecting elements 102, are converged by the light-converging lenses 106, and are focused at the predetermined output channel optical waveguides 107. This causes a path of the light signal that is input from the input channel optical waveguide 103 to be switched, so that the light signal is output from the predetermined output channel optical waveguide 107.

An example of a method of manufacturing the optical switch module having the above-described structure is given below. First, as shown in, for example, FIG. 2A, a slab optical waveguide substrate unit 100 is formed so that input channel optical waveguides 103, an input-side lens array 104, a first light-deflecting element mounting opening 112, a slab optical waveguide 105, a second light-deflecting element mounting opening 113, an output-side lens array 106, and an output channel optical waveguide 107 are integrally formed. Next, as shown in, for example, FIGS. 2B and 2C, a first light-deflecting element array 101 and a second light-deflecting element array 102 are mounted to the light-deflecting element mounting opening 112 and to the light-deflecting element mounting opening 113 in a slab optical waveguide substrate unit 100, respectively. (For example, refer to the U.S. Pat. No. 6,504,966).

In this manufacturing method, since the number of joints that are joined with an adhesive is small, it is possible to restrict the influence resulting from positional displacement with time at the joints. For mounting the light deflecting element arrays 101 and 102 onto the slab optical waveguide substrate unit 100, active alignment is performed while monitoring the intensity of output light. During the active alignment, when light (monitor light, propagating light) that propagates through the slab optical waveguide is displaced from a predetermined traveling angle, the propagating light does not combine at the output channel optical waveguides 107, and positional adjustment of the output-side lens array (light-converging lens array) 106 cannot be carried out either. Therefore, it is difficult to perform the alignment (active alignment) of the first light-deflecting element array 101 and the second light-deflecting element array 102.

The causes of the angular displacement of the propagating light are, for example, polishing precision of the light deflecting elements and crystal characteristics (ununiformity in film thicknesses and refractive indices) of the light deflecting elements.

Another example of manufacturing the optical switch module is given below. For example, as shown in FIGS. 3A to 3D, each component making up the optical switch module is individually formed. The components are located where an input channel optical waveguide array 103 and an input-side lens array 104 are formed, the component where a first light-deflecting element array 101 is mounted, the component where a slab optical waveguide 105 is formed, the component where a second light-deflecting element array 102 is mounted, and the component where an output-side lens array 106 and an output channel optical waveguide array 107 are formed. These components are joined to each other with a butt-joint, so that the optical switch module is manufactured. (For example, refer to the U.S. Pat. No. 6,504,966).

In this manufacturing method, it is possible to join each component as a result of active alignment while monitoring the intensity of output light. However, the characteristics of the optical switch module may become deteriorated due to positional displacement with time at each joint. In particular, if the number of such joints is large, the characteristics of the optical switch module tend to be deteriorated due to positional displacement with time at each joint.

Accordingly, the related art has the problem that alignment by active alignment cannot be reliably performed due to an angular displacement of propagating light.

SUMMARY

An optical module and method of manufacturing the optical module related to various disclosures of the present invention having a plurality of optical waveguide substrates connected to each other with an optical adhesive.

DETAILED DESCRIPTION OF THE EMBODIMENTS

Figure 1A:
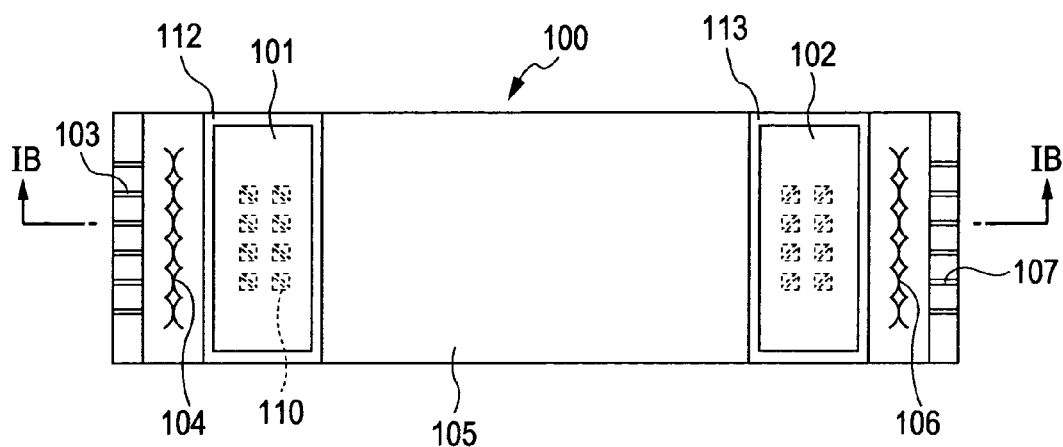
FIGS. 1A and 1B are a plan view of a sectional view of an optical switch module.
Figure 1B:
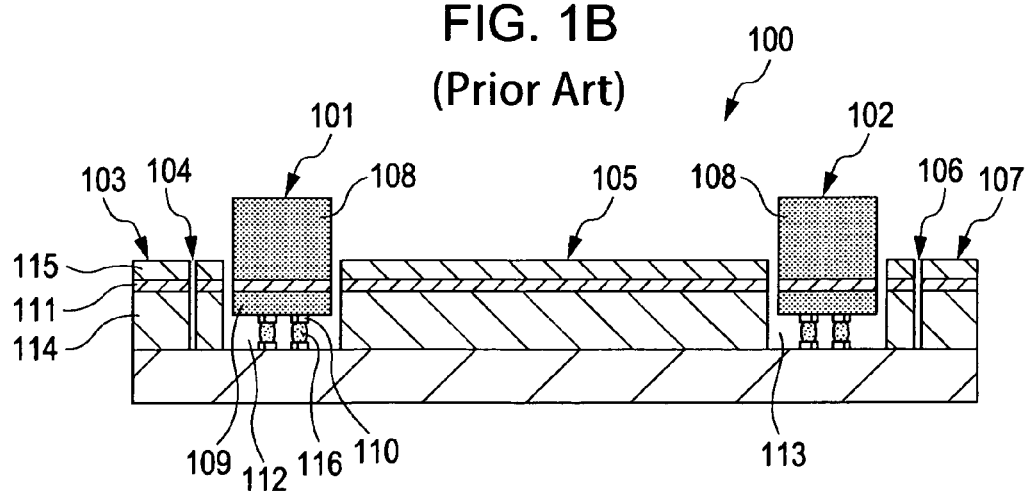
Figure 2A:
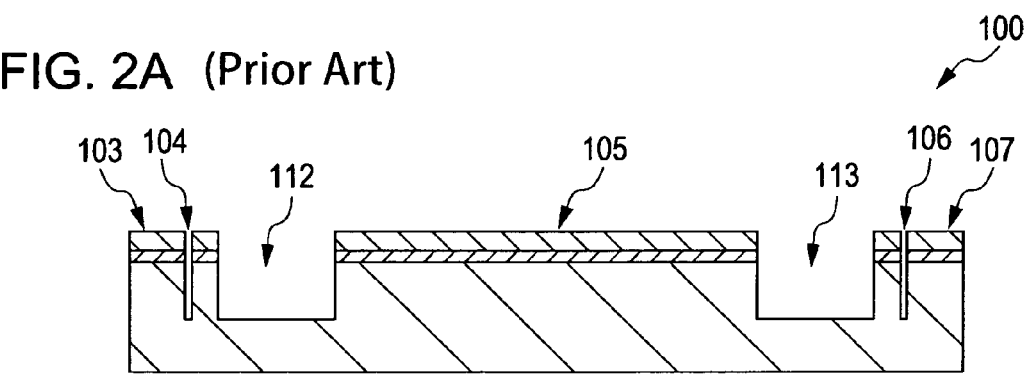
FIGS. 2A to 2C illustrate a method of manufacturing the optical switch module.
Figure 2B:
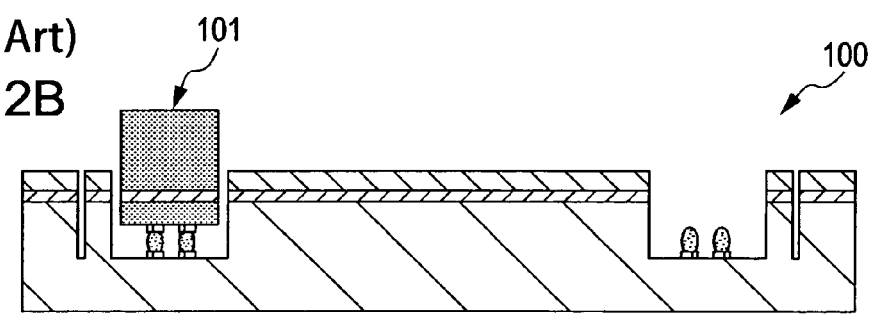
Figure 2C:
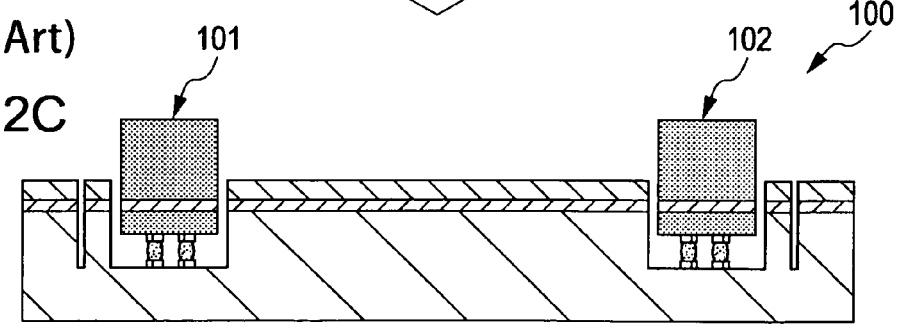
Figure 3A:
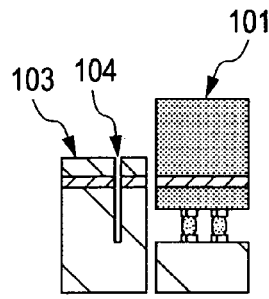
FIGS. 3A to 3D illustrate another method of manufacturing the optical switch module.
Figure 3B:
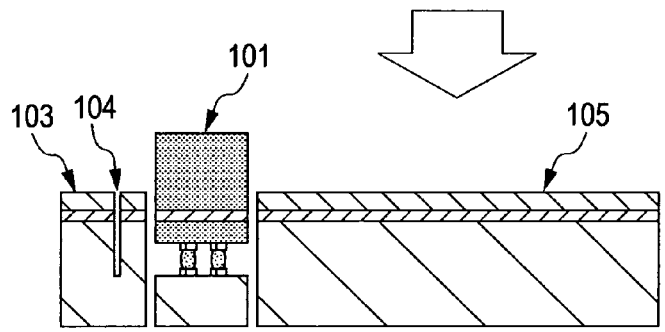
Figure 3C:
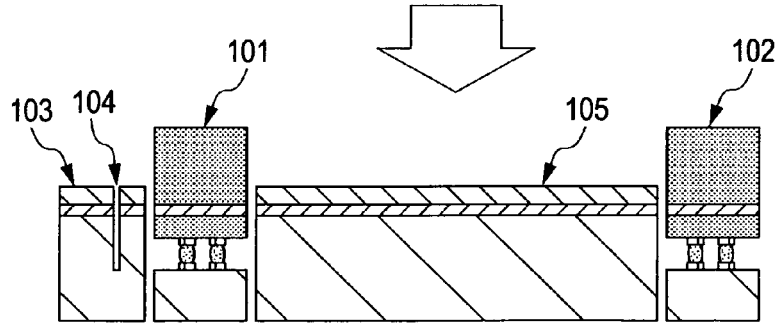
Figure 3D:
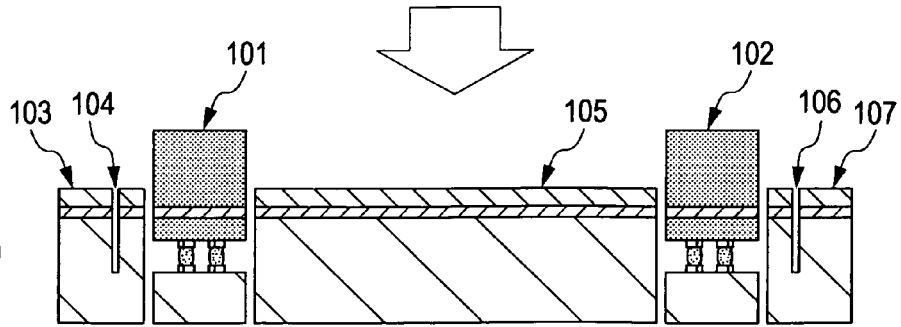
Figure 4:
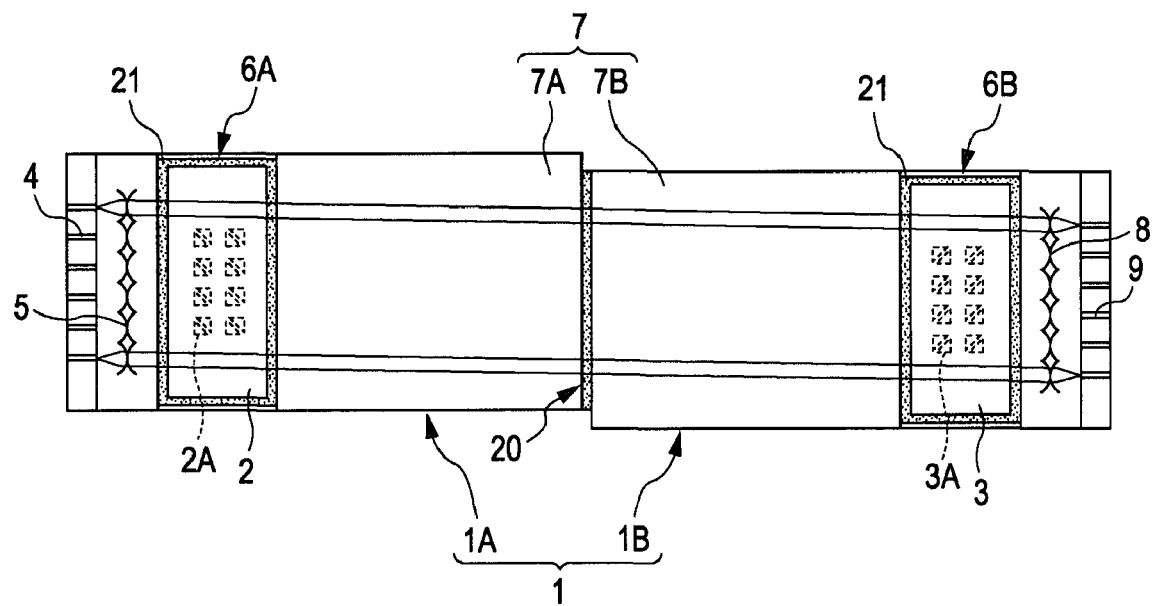
FIG. 4 is a plan view of an optical module regarding an embodiment of the present invention.

FIG. 4 shows an optical module according to an embodiment of the present invention. The optical module includes a plurality of (here, two) slab optical waveguide substrates, that is, slab optical waveguide substrates 1A and 1B; an input-side light deflecting element array (first light-deflecting element array) 2 including a plurality of light deflecting elements 2A; and an output-side light deflecting element array (second light-deflecting element array) 3 including a plurality of light deflecting elements 3A. End surfaces of the slab optical waveguide substrates 1A and 1B are joined (adhered/secured) to each other with an optical adhesive 20 (adhesive formed of an optical material, adhesive having high optical transparency).

That is, the optical module is made up of an optical switch module in which the plurality of (here, two) light deflecting element arrays, that is, the light deflecting element arrays 2 and 3, are mounted onto one slab optical waveguide substrate unit 1, formed by joining the slab optical waveguide substrates 1A and 1B to each other. In FIG. 4, reference numeral 21 denotes an optical adhesive.

Here, as shown in FIG. 4, in the slab optical waveguide substrate 1A (1B), a plurality of channel optical waveguides 4 (9), a plurality of lenses 5 (8), one element mounting opening (recess; fitting groove) 6A (6B) for mounting the light deflecting elements thereto, and a slab optical waveguide portion 7A (7B) are formed on the same substrate.

In the embodiment, as shown in FIG. 4, one slab optical waveguide substrate unit 1 has the plurality of input channel optical waveguides (input channel optical waveguide array) 4; the plurality of collimator lenses (input-side lens array) 5; the plurality of (here, two) element mounting openings, that is, the element mounting openings 6A and 6B; a common optical waveguide (slab optical waveguide) 7, the plurality of light-converging lenses (output-side lens array) 8, and the plurality of output channel optical waveguides (output channel optical waveguide array) 9. In addition, as shown in FIG. 4, the one slab optical waveguide substrate unit 1 is severed at a portion where the slab optical waveguide 7 is formed. Further, the severed surfaces are polished, so that the slab optical waveguide substrates 1A and 1B are formed. The end surfaces (severed surfaces; polished surfaces) of the slab optical waveguide portions 7A and 7B, provided at the respective slab optical waveguide substrates 1A and 1B, are adhered to each other with the optical adhesive 20.

As shown in FIG. 4, the input-side light deflecting element array 2 and the output-side light deflecting element array 3 are mounted to the respective element mounting openings 6A and 6B, which are formed in the respective slab optical waveguide substrates 1A and 1B.

Using each input-side light deflecting element 2A of the input-side light deflecting element array 2 and each output-side light deflecting element 3A of the output-side light deflecting element array 3, a path of a light signal that is input from one of the input channel optical waveguides 4 is switched to output the light signal to one of the output channel optical waveguides 9.

The plurality of input channel optical waveguides 4 is connected to respective input optical fibers making up an input fiber array (not shown). A light signal is input from each input optical fiber, so that each light signal (input light) is guided to the input-side light deflecting element array 2, disposed at the input-side element mounting opening 6A.

As shown in FIG. 4, the plurality of collimator lenses 5 are provided in correspondence with the respective input channel optical waveguides 4. The collimator lenses 5 convert the light signals (input light) guided through the respective input channel optical waveguides 4 into collimated light (parallel light). That is, each collimator lens 5 converts the light radially exiting from its corresponding input channel optical waveguide 4 into parallel light, so that each parallel light is incident upon the corresponding input-side light deflecting element 2A.

As shown in FIG. 4, the common optical waveguide 7 is made up of a slab optical waveguide through which all the light signals propagate in common. That is, the slab optical waveguide 7 is provided as a common optical waveguide between the element mounting openings 6A and 6B. The light signals, whose direction of propagation is changed by the input-side light deflecting elements 2A of the input-side light deflecting element array 2 mounted to the input-side element mounting opening 6A, are guided to the output-side light deflecting elements 3A of the output-side light deflecting element array 3 mounted to the output-side element mounting opening 6B.

As shown in FIG. 4, the plurality of light-converging lenses 8 is provided in correspondence with the respective output channel optical waveguides 9. The output collimated light, whose direction of propagation is changed by the output-side light deflecting elements 3A of the output-side light deflecting element array 3 (disposed at the output-side element mounting opening 6B) and which is output, is converged by the respective light-converging lenses 8, and are combined at the respective output channel optical waveguides 9.

The output channel optical waveguides 9 are connected to respective output optical fibers making up an output fiber array (not shown), so that the lights, converged by the light-converging lenses 8, are guided to the respective output optical fibers. That is, the light signals, which are focused at the respective output channel optical waveguides 9 by the light-converging lenses 8 and which propagate through the respective output channel optical waveguides 9, are output to the respective output optical fibers.

The number of input channel optical waveguides 4 and the number of output channel optical waveguides 9 may be the same or different.

As shown in FIG. 4, the input-side light deflecting element array 2 includes the plurality of light deflecting elements 2A, and is mounted to the input-side element mounting opening 6A among the element mounting openings 6A and 6B. That is, the input-side light deflecting element array 2 is joined to an output-side end surface of a portion (slab optical waveguide) where the plurality of collimator lenses 5 are provided and to an input-side end surface of the common optical waveguide 7.

Here, as shown in FIG. 4, the input-side light deflecting elements 2A are provided in correspondence with the respective input channel optical waveguides 4 and the respective collimator lenses 5.

Figure 6A:
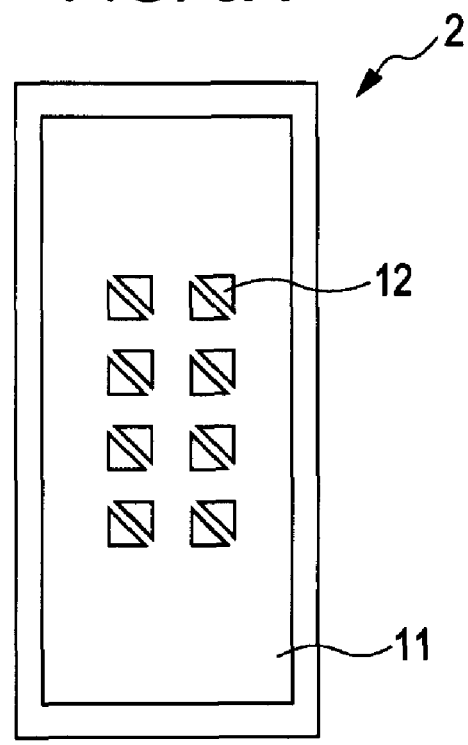
FIGS. 6A and 6B are a plan view and a sectional view of a light deflecting element array making up the optical module regarding the embodiment of the present invention.
Figure 6B:
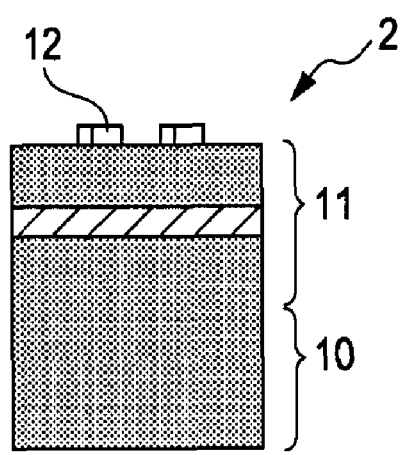

As shown in FIGS. 6A and 6B, the input-side light deflecting element array 2 includes a conductive substrate 10 (here, an Nb-STO substrate), a slab optical waveguide 11, and pairs of prism electrodes 12. The conductive substrate 10 serves as an upper electrode. The slab optical waveguide 11 is formed of a material (here, PLZT) having an electro-optical effect and formed on the conductive substrate 10. The prism electrodes 12 serve as lower electrodes, and are formed on the surface of the slab optical waveguide 11 so that, for every channel (port), one pair or a plurality of pairs in series are formed.

As shown in FIG. 4, the output-side light deflecting element array 3 includes the plurality of light deflecting elements 3A, and is mounted to the output-side element mounting opening 6B among the element mounting openings 6A and 6B. That is, the output-side light deflecting element array 3 is joined to an output-side end surface of the common optical waveguide 7 and to an input-side end surface of a portion (slab optical waveguide) where the plurality of light-converging lenses 8 are provided.

Here, as shown in FIG. 4, the output-side light deflecting elements 3A are provided in correspondence with the respective output channel optical waveguides 9 and the respective light-converging lenses 8.

The output-side light deflecting element array 3 includes a conductive substrate 10, a slab optical waveguide 11, and pairs of prism electrodes 12. The conductive substrate 10 serves as an upper electrode. The slab optical waveguide 11 is formed of a material having an electro-optical effect and formed on the conductive substrate 10. The prism electrodes 12 serve as lower electrodes, and are formed on the surface of the slab optical waveguide 11 so that, for every channel (port), one pair or a plurality of pairs in series are formed.

Figure 5:
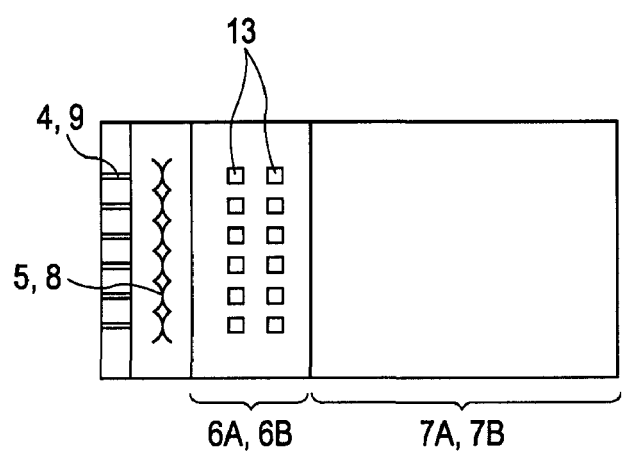
FIG. 5 is a plan view of a slab optical waveguide substrate making up the optical module regarding the embodiment of the present invention.

As shown in FIG. 5, electrode pads 13 are provided at the bottom surface defining the element mounting opening 6A (6B) of the slab optical waveguide substrate 1A (1B), so as to be situated at locations facing the prism electrodes 12 provided at the light deflecting element array 2 (3) mounted to the element mounting opening 6A (6B). Electrical wires (not shown) are connected to the electrode pads 13.

The prism electrodes 12 of the light deflecting element array 2 (3) and the electrode pads 13 at the element mounting opening 6A (6B) of the slab optical waveguide substrate 1A (1B) are connected to each other with a conductive paste (metal paste such as a silver paste; conductive adhesive) 15. (See FIG. 7C).

Through the electrode pads 13 (and the electrical wires that are not shown), which are formed on the bottom surface defining the element mounting opening 6A (6B) of the slab optical waveguide substrate 1A (1B), a voltage is applied to the slab optical waveguide 11 by the upper electrode 10 and the lower electrodes 12, to change the refractive index of the slab optical waveguide 11. Accordingly, an electro-optical effect is made use of, so that the direction of propagation of light signals can be changed.

Therefore, the direction of propagation of the light signals is changed at the input-side light deflecting elements 2A. Then, the direction of propagation of the light signals that have propagated through the common optical waveguide 7 is changed again by the output-side light deflecting elements 3A. Accordingly, the light signals can be focused at the output channel optical waveguides 9 through the light-converging lenses 8.

In the optical switch having such a structure, by controlling voltage applied to each input-side light deflecting element 2A and to each output-side light deflecting element 3A, the path of the light signal that has been input from one of the input channel optical waveguides 4 is selected, so that the light signal can be output from one of the output channel optical waveguides 9.

Although, in the embodiment, the slab optical waveguide substrate unit 1 is described as including a plurality of input channel optical waveguides and a plurality of output channel optical waveguides, the present invention is not limited thereto. For example, the slab optical waveguide substrate unit 1 may have a structure which does not include input channel optical waveguides and output channel optical waveguides, but has an input fiber array and an output fiber array connected to areas where lenses (collimator lenses and light-converging lenses) are provided, respectively.

Next, a method of manufacturing an optical module (optical switch module) according to an embodiment of the present invention will be described.

A method of manufacturing a slab optical waveguide substrate, a method of manufacturing a light deflecting element array, and the method of manufacturing an optical module (optical switch module) will hereinafter be described in that order.

[Method of Manufacturing Slab Optical Waveguide Substrate]

First, quartz is deposited onto, for example, a silicon substrate (or a quartz substrate; quartz wafer) by, for example, a thermal oxidation method or an MOCVD method, so that a lower clad layer at a slab optical waveguide substrate unit 1 is formed. A quartz substrate serving as a lower clad layer may also be used.

Next, quartz, whose refractive index is adjusted as a result of doping it with Gallium (Ga), is deposited onto the lower clad layer by, for example, the MOCVD method, so that a core layer is formed).

Next, the core layer is patterned into a channel form by, for example, RIE).

Then, quartz is deposited onto the core layer by, for example, a method that is similar to that used to form the lower clad layer, so that an upper clad layer is formed. By this, input channel optical waveguides 4 and output channel optical waveguides 9 are formed on the silicon substrate).

After forming the quartz optical waveguides in this way, dry etching, such as RIE, is performed to process the quartz optical waveguides that are formed in a collimator lens area and a light-converging lens area. As a result, a plurality of collimator lenses 5 (two-dimensional lenses; a collimator lens array) and a plurality of light-converging lenses 8 (two-dimensional lenses; a light-converging lens array) are formed, and the portions of the quartz optical waveguides, formed in areas where an input-side light deflecting element array 2 and an output-side light deflecting element array 3 are mounted, are removed to simultaneously form an input-side element mounting opening 6A and an output-side element amounting opening 6B). This causes a common optical waveguide 7, serving as a slab optical waveguide, to be formed between the input-side element mounting opening 6A and the output-side element mounting opening 6B.

Thereafter, by, for example, sputtering or plating, metallic films are laminated to the bottom surfaces defining the respective input-side element mounting opening 6A and output-side element mounting opening 6B in the slab optical waveguide substrate unit 1, so that electrode pads 13 (and electrical wires connected thereto) are formed (see FIG. 5).

It is desirable that grooves making up the collimator lenses 5 and the light-converging lenses 8, processed by, for example, RIE, be filled with a material (lens filling material) having a refractive index that is lower than that of the core layer.

Figure 7A:
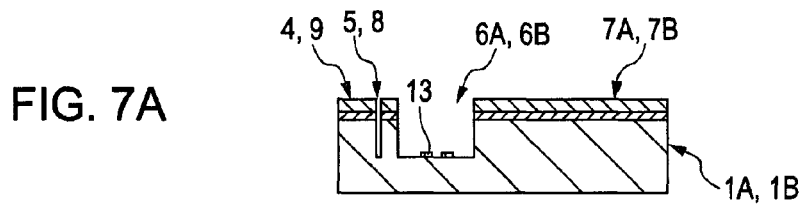
FIGS. 7A to 7E are sectional views illustrating a method of manufacturing the optical module regarding the embodiment of the present invention.

Accordingly, one slab optical waveguide substrate unit 1, including the plurality of input channel optical waveguides 4, the plurality of collimator lenses 5, the element mounting openings 6A and 6B (here, two element mounting openings), the common optical waveguide (slab optical waveguide) 7, the plurality of light-converging lenses 8, and the plurality of output channel optical waveguides 9, is formed. Then, the one slab optical waveguide substrate unit 1 is severed at a portion (here, a central portion) where the slab optical waveguide 7 is formed. In addition, the severed surfaces (end surfaces at the slab optical waveguide 7 side) are polished, so that, as shown in FIG. 7A, a plurality of (here, two) slab optical waveguide substrates, that is, slab optical waveguide substrates 1A and 1B are formed. In the slab optical waveguide substrate 1A (1B), the plurality of channel optical waveguides 4 (9), the plurality of lenses 5 (8), one element mounting opening 6A (6B), and slab optical waveguide portion 7A (7B) are formed on the same substrate. Here, an end surface of the slab optical waveguide 1A (1B) at the side of the channel optical waveguides 4 (9) is also polished.

Here, although the slab optical waveguide substrate unit is formed of quartz, the present invention is not limited thereto, so that the slab optical waveguide substrate unit may be formed of polymer.

[Method of Manufacturing Light Deflecting Element Array]

First, for example, PLZT ($Pb_xLa_{1-x}(Zr_yTi_{1-y}O_3)$) is deposited onto a $SrTiO_3$ substrate (conductive substrate; Nb-STO substrate; may function as an electrode) by, for example, a sol-gel method, a pulsar laser deposition (PLD) method, or an MOCVD method, so that a lower clad layer (PLZT thin layer) is formed (see FIG. 6B). The $SrTiO_3$ substrate is provided with conductivity as a result of doping it with niobium (Nb).

Next, for example, PZT ($Pb(Zr_yTi_{1-y}O_3)$) or PLZT, whose refractive index is increased as a result of changing its composition, is deposited onto the lower clad layer by a similar method, so that a core layer (PLZT thin layer) is formed (see FIG. 6B).

Then, for example, PLZT having a composition that is the same as that of the lower clad layer is deposited onto the core layer, so that an upper clad layer is formed (see FIG. 6B).

After forming a slab optical waveguide using a material having an electro-optical effect in this way, for example, sputtering or photolithography is performed to form metal films in prism form on the surface of the upper clad layer. As a result, one pair of prism electrodes or a plurality of pairs of prism electrodes 12 in series is formed. Then, polishing/processing is performed to predetermined dimensions, to perform reflection prevention coating (AR coating) on polished end surfaces. This manufactures a light deflecting element array 2 (3) including a plurality of light deflecting elements 2A (2B) (see FIG. 6B).

[Method of Manufacturing Optical Module (Optical Switch Module)]

Figure 7B:
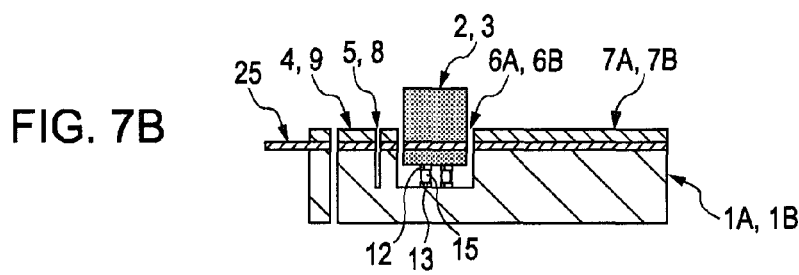
Figure 7C:
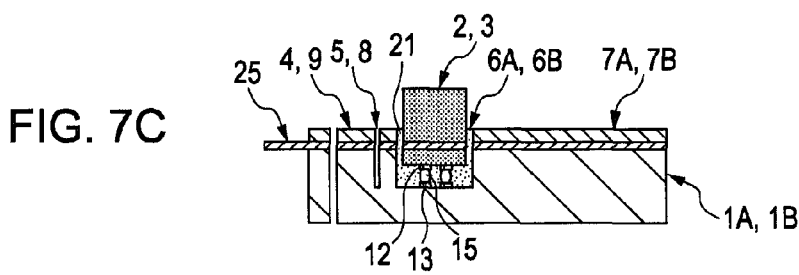

First, as shown in FIGS. 7B and 7C, the light deflecting element array 2 (3) is fitted and adhered/secured to the recess 6A (6B) of the slab optical waveguide substrate 1A (1B) manufactured in the above-described way. By this, the light deflecting element array 2 (3) is mounted onto the slab optical waveguide substrate 1A (1B). This is called a light-deflecting element mounting step.

In the embodiment, when mounting the light deflecting element array 2 (3) to the slab optical waveguide substrate 1A (1B) in this way, the slab optical waveguide substrate 1A (1B) and the light deflecting element array 2 (3) are aligned to each other in the following way.

That is, first, as shown in FIG. 7B, using a dispenser, a conductive paste 15 (conductive adhesive; here, silver paste, such as TB3301 manufactured by ThreeBond Co., Ltd.) is applied to the electrode pads 13, formed at the element mounting opening 6A (6B) in the slab optical waveguide substrate unit 1.

Next, as shown in FIG. 7B, a fiber array 25 is brought close to the channel optical waveguides 4 (9) of the slab optical waveguide substrate 1A (1B), and is aligned so that light from a light source is incident upon the channel optical waveguides 4 (9) through the fiber array 25. Then, it is held in the aligned state.

Next, as shown in FIG. 7B, the light deflecting element array 2 (3) is disposed in the element mounting opening 6A (6B) of the slab optical waveguide substrate 1A (1B).

More specifically, as shown in FIG. 7B, the light deflecting element array 2 (3), secured to a suction tool head, is moved to a location that is directly above the element mounting opening 6A (6B) by an automatic stage. Then, the light deflecting element array 2 (3) is lowered slowly into the element mounting opening 6A (6B) of the slab optical waveguide substrate 1A (1B) with the prism electrode 12 side of the light deflecting element array 2 (3) being faced downward. Here, the prism electrodes 12 of the light deflecting element array 2 (3) and the conductive adhesive 15, applied to the electrode pads 13, are in contact with each other.

Then, the light deflecting element array 2 (3) is aligned in the element mounting opening 6A (6B) of the slab optical waveguide substrate 1A (1B).

Figure 8:
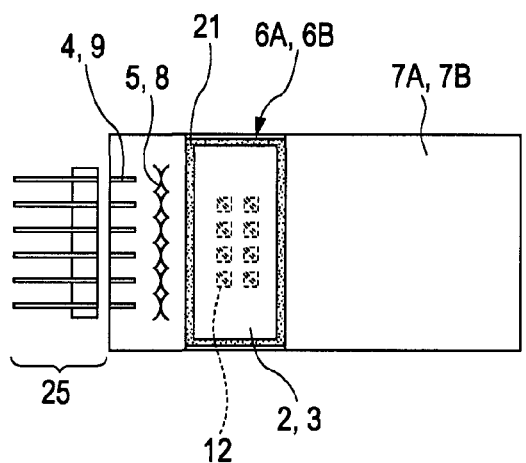
FIG. 8 illustrates the method of manufacturing the optical module regarding the embodiment of the present invention, and is a plan view related to a step shown in FIG. 7C.

Here, as shown in FIG. 7C and FIG. 8, while light (signal light), which is output from an end surface (severed surface; polished surface) of the slab optical waveguide 7A (7B) after alignment light (monitor light) is incident upon the channel optical waveguides 4 (9) through the fiber array 25 and propagates through the channel optical waveguides 4 (9), the lenses (lens array) 5 (8), the light deflecting element array 2 (3), and the slab optical waveguide portion 7A (7B), is being monitored with a power meter or an infrared camera, active alignment is carried out so that the intensity of the exiting light reaches a maximum. By this, the slab optical waveguide substrate 1A (1B) and the light deflecting element array 2 (3) are aligned to each other, so that their mounting positions are determined.

Next, as shown in FIG. 7C and FIG. 8, the conductive adhesive 15 is hardened, so that the electrodes 12 of the light deflecting element array 2 (3) and the electrode pads 13 in the element mounting opening 6A (6B) of the slab optical waveguide substrate 1A (1B) are connected to each other.

Then, as shown in FIG. 7C and FIG. 8, the element mounting opening 6A (6B) is filled with an adhesive 21, which is hardened to adhere/secure the light deflecting element array 2 (3) to the element mounting opening 6A (6B) of the slab optical waveguide substrate 1A (1B). The adhesive 21 contains, for example, ultraviolet curable resin (UV resin) or thermosetting resin, and is an optical adhesive such as GA700H (manufactured by NTT-AT).

Here, although the light deflecting element array 2 (3) is adhered/secured to the element mounting opening 6A (6B) as a result of hardening the optical adhesive 21 after hardening the conductive adhesive 15, the present invention is not limited thereto. For example, the conductive adhesive 15 may be hardened after adhering/securing the light deflecting element array 2 (3) to the element mounting opening 6A (6B) as a result of hardening the optical adhesive 21.

By this, the light deflecting element array 2 (3) is mounted to the slab optical waveguide substrate 1A (1B).

Accordingly, after forming the slab optical waveguide substrates 1A and 1B having the respective light deflecting element arrays 2 and 3 (two light deflecting element arrays) mounted thereto, these slab optical waveguide substrates 1A and 1B are joined to each other.

Figure 7D:
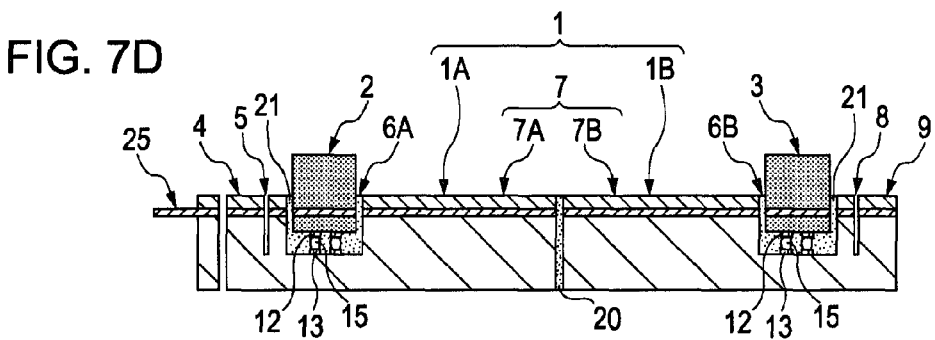

More specifically, as shown in FIG. 7D, the slab optical waveguide substrates 1A and 1B are disposed on an alignment stage (not shown) so that the end surfaces of the slab optical waveguides 7A and 7B thereof, which face each other, are close to each other.

Next, the slab optical waveguide substrates 1A and 1B are aligned to each other.

Here, as shown in FIG. 7D, the alignment light (monitor light) is incident upon the channel optical waveguides 4 of the slab optical waveguide substrate 1A through the fiber array 25. The alignment light propagates through the channel optical waveguides 4, the lenses (lens array) 5, the light deflecting element array 2, and the slab optical waveguide portion 7A, and exits from the end surface (severed surface; polished surface) of the slab optical waveguide portion 7A.

The exiting light (light signal) is incident from the end surface (severed surface; polished surface) of the slab optical waveguide 7B of the other slab optical waveguide substrate 1B, propagates through the slab optical waveguide portion 7B, the light deflecting element array 3, the lenses (lens array) 8, and the channel optical waveguides 9, and exits from end surfaces of the channel optical waveguides 9.

Accordingly, while the alignment light (exiting light), which exits from the channel optical waveguides 9 of the other slab optical waveguide substrate 1B after being incident from the channel optical waveguides 4 of the slab optical waveguide substrate 1A, is being monitored with a power meter or an infrared camera, an alignment stage is moved (that is, one or both of the slab optical waveguide substrates are slid in a lateral direction) so that the intensity of the exiting light becomes a maximum. By this, the slab optical waveguide substrates 1A and 1B are aligned (that is, active alignment is carried out), so that the positions of adhesion of the slab optical waveguide substrates 1A and 1B are determined.

By performing lateral (horizontal) alignment using an alignment stage in this way, it is possible to eliminate angular displacement of propagating light.

The exiting light may be monitored with a power meter through a fiber array (not shown) brought close to the channel optical waveguides 9, or may be monitored as a result of bringing a power meter or an infrared camera close to the channel optical waveguides 9.

Next, as shown in FIG. 7D, the end surfaces (severed surfaces; polished surfaces) of the slab optical waveguide portions 7A and 7B of the respective slab optical waveguide substrates 1A and 1B are adhered/secured (joined) to each other with the optical adhesive 20. The optical adhesive 20 is, for example, an adhesive having a transmittance of at least 90% in a wavelength range of around 1550 nm. In addition, in the wavelength range of around 1550 nm, the optical adhesive 20 is, for example, an adhesive having a refractive index of approximately 1.46 D (diopter). The optical adhesive 20 may contain ultraviolet curable resin or a thermoplastic resin, so that, for example, epoxy resin or acrylic resin may be used. If, for example, ultraviolet curable resin is used, AT8224 or GA700H, manufactured by NTT-AT, can be used. When ultraviolet curable resin is used as the optical adhesive 20, the end surfaces are joined as a result of irradiating the resin with ultraviolet light of approximately 10 mW/cm$^2$, at room temperature. If, for example, thermoplastic resin is used, 35553-HM, manufactured by EMI, can be used. When thermoplastic resin is used as the optical adhesive 20, the end surfaces are joined as a result of heating the resin for 30 minutes at a temperature of 110° C. Contraction rate of the optical adhesive 20 from before the joining of the end surfaces to after the joining of the end surfaces is, for example, within ±1 μm. The film thickness of the optical adhesive 20 after the joining of the end surfaces is, for example, 10 to 20 μm. The material used for the optical adhesive 20 may be the same as or different from the material used for the optical adhesive 21, in which the light deflecting elements are embedded.

Figure 7E:
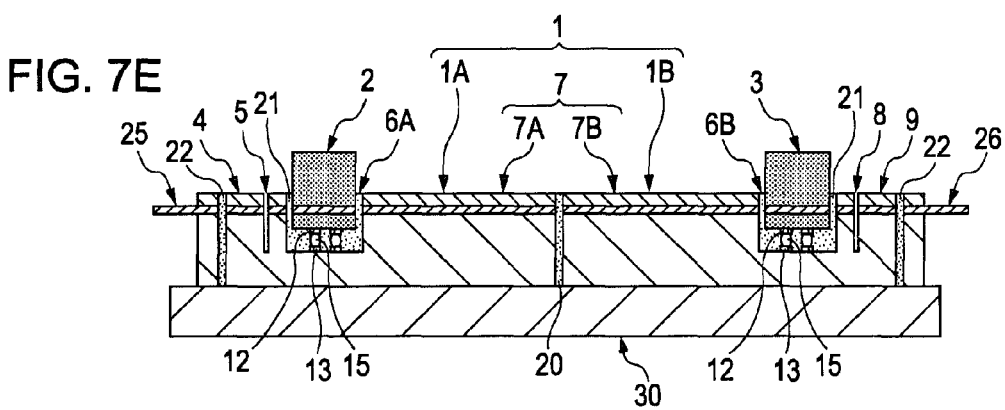
Figure 9:
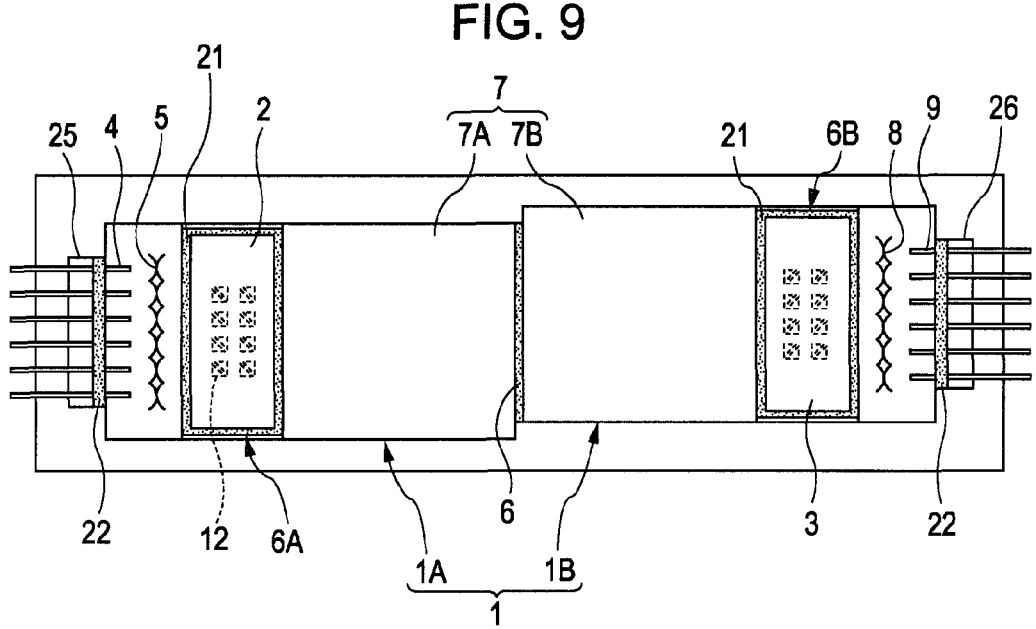
FIG. 9 illustrates the method of manufacturing the optical module regarding the embodiment of the present invention, and is a plan view related to a step shown in FIG. 7E.

Next, as shown in FIG. 7E and FIG. 9, using an optical adhesive 22, the fiber array 25 is adhered/secured (joined) to end surfaces of the channel optical waveguides 4 of the slab optical waveguide substrate 1A, and a fiber array 26 is adhered/secured (joined) to the end surfaces of the channel optical waveguides 9 of the slab optical waveguide substrate 1B.

Here, although the fiber arrays 25 and 26 are adhered/secured to the respective end surfaces after adhering/securing the slab optical waveguide substrates 1A and 1B to each other, the present invention is not limited thereto. For example, prior to adhering/securing the slab optical waveguide substrates 1A and 1B to each other, the fiber arrays 25 and 26 may be adhered/secured to the respective slab optical waveguide substrates 1A and 1B.

Finally, as shown in FIG. 7E and FIG. 9, the slab optical waveguide substrates 1A and 1B, which have underwent the above-described adhering/securing operations, are adhered/secured to a base 30 so that the portion where the slab optical waveguide substrates 1A and 1B are adhered to each other and the portions where the slab optical waveguide substrates 1A and 1B and the respective fiber arrays 25 and 26 are adhered to each other are not displaced.

Here, to reduce the influence of temperature characteristics of the optical switch module, the base 30 is, for example, a base having a heat-regulating function and using, for example, a Peltier element.

Therefore, according to the optical module and the method of manufacturing the optical module according to the embodiments of the present invention, even for the case in which angular displacement of propagating light occurs, active alignment is reliably performed, so that mounting precision can be increased. In particular, since the number of joints is small, it is possible to restrict characteristic deterioration caused by positional displacement with time at each joint. As a result, when forming an optical module as a result of mounting light deflecting element arrays 2 and 3, it is possible to realize an optical module (optical switch module) having low propagation loss. In addition, the yield of light deflecting elements is increased, so that manufacturing costs can be reduced.

The optical switch module may be an optical module in which one light deflecting element is mounted to the slab optical waveguide substrate unit 1, or one in which three or more light deflecting elements are mounted to the slab optical waveguide substrate unit 1.

The optical switch module may be one in which slab optical waveguide substrates 1A and 1B are separately formed as shown in FIG. 5 and FIG. 7A. In this case, end surfaces of slab optical waveguide portions making up the slab optical waveguide substrate unit may be polished and formed into polished surfaces.

Figure 10A:
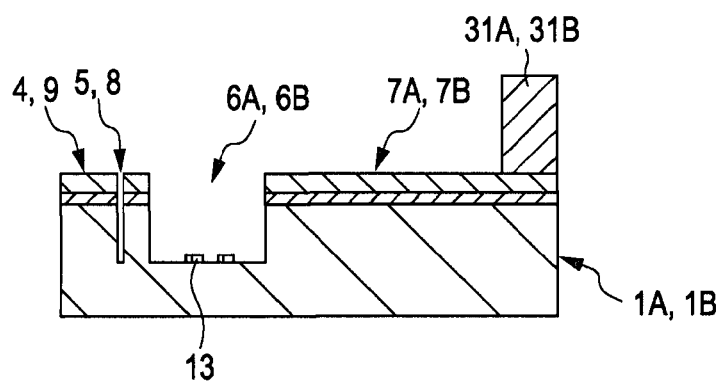
FIGS. 10A and 10B are sectional views of an optical module regarding another embodiment of the present invention.
Figure 10B:
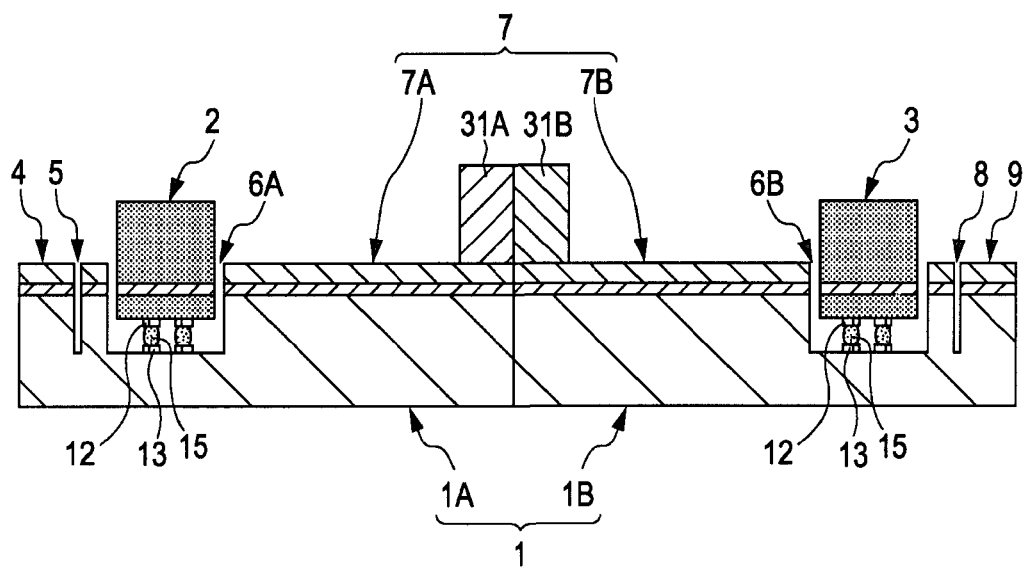

FIGS. 10A and 10B are sectional views of an optical module according to another embodiment of the present invention. In the optical module according to another embodiment of the present invention, for example, a quartz plate is adhered to a surface of a slab optical waveguide portion 7A (7B) with an adhesive, to form a flat surface that is formed consecutively with an end surface (adhesion surface) of the slab optical waveguide portion 7A (7B). In addition, a projection 31A (31B) projecting from a surface of the slab optical waveguide portion 7A (7B) is provided at the slab optical waveguide portion 7A (7B). As shown in FIG. 10B, end surfaces of the slab optical waveguide portions 7A and 7B and flat (side) surfaces of the projections 31A and 31B are adhered to each other with an optical adhesive to increase an adhesion area or adhesion strength. It is desirable to provide the projection 31A (31B) prior to polishing a severed surface of the slab optical waveguide portion 7A (7B), and to polish the side surface of the projection 31A (31B) as well as the severed surface of the slab optical waveguide portion 7A (7B). In this case, the projection 31A (31B) functions as a fixture.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical module comprising:
    a plurality of optical waveguide substrates having element mounting openings and end surfaces; and
    a plurality of light deflecting element arrays mounted to the respective element mounting openings of the plurality of optical waveguide substrates, the plurality of light deflecting element arrays including a plurality of light deflecting elements,
    wherein the end surfaces of the plurality of optical waveguide substrates are adhered to each other with an optical adhesive.

2. The optical module according to claim 1, wherein the optical adhesive has a transmittance of at least 90%.

3. The optical module according to claim 1, wherein the optical adhesive has a refractive index of approximately 1.46 D.

4. The optical module according to claim 1, wherein the optical adhesive includes an ultraviolet curable resin or a thermoplastic resin.

5. The optical module according to claim 1, wherein the plurality of optical waveguide substrates are provided as a result of severing one optical waveguide substrate unit having the plurality of element mounting openings.

6. The optical module according to claim 5, wherein said one optical waveguide substrate unit comprises:
    a plurality of input channel optical waveguides to which a signal light is input;
    a plurality of collimator lenses that convert the signal light which has propagated through the plurality of input channel optical waveguides into collimated light;
    a slab optical waveguide that guides the collimated light;
    a plurality of light-converging lenses that converge the collimated light that has propagated through the slab optical waveguide; and
    a plurality of output channel optical waveguides to which the light converged by the plurality of light-converging lenses is output.

7. The optical module according to claim 1, wherein the optical waveguide substrates each include a flat surface and a projection, each flat surface being provided consecutively with the end surface, which is an adhesion surface, each projection projecting from a surface of the corresponding optical waveguide substrate;
    wherein the end surfaces of the plurality of optical waveguide substrates and flat surfaces of the projections are adhered to each other with the optical adhesive.

8. The optical module according to claim 1, wherein the optical waveguide substrates are slab optical waveguide substrates.

9. A method of manufacturing an optical module comprising:
    forming a plurality of optical waveguide substrates having element mounting openings and end surfaces;
    mounting a plurality of light deflecting element arrays to the respective element mounting openings of the plurality of optical waveguide substrates, the plurality of light deflecting element arrays including a plurality of light defecting elements;
    aligning the optical waveguide substrates with respect to each other, said optical waveguide substrates having the light deflecting element arrays mounted thereto; and
    adhering end surfaces of said optical waveguide substrates to each other with an optical adhesive.

10. The method of manufacturing an optical module according to claim 9, wherein the adhering step includes hardening the optical adhesive by thermal processing or ultraviolet irradiation processing.

11. The method of manufacturing an optical module according to claim 10, wherein a contraction rate of the optical adhesive, resulting from the hardening of the optical adhesive, is within ±1 μm.

12. The method of manufacturing an optical module according to claim 9, wherein the step of forming the plurality of optical waveguide substrates includes severing one optical waveguide substrate unit including the plurality of element mounting openings.

13. The method of manufacturing an optical module according to claim 12, wherein said one optical waveguide substrate unit includes
a plurality of input channel optical waveguides to which a signal light is input;
a plurality of collimator lenses that convert the signal light which has propagated through the plurality of input channel optical waveguides into collimated light;
a slab optical waveguide that guides the collimated light;
a plurality of light-converging lenses that converge the collimated light that has propagated through the slab optical waveguide; and
a plurality of output channel optical waveguides to which the light converged by the plurality of light-converging lenses is output,
wherein the step of forming the plurality of optical waveguide substrates includes severing a portion where the slab optical waveguide is formed.

14. The method of manufacturing an optical module according to claim 13, wherein the mounting step includes
inserting the light deflecting element arrays into the respective element mounting openings,
entering a light to the input channel optical waveguides or the output channel optical waveguides, and
monitoring the light exiting from a severed surface of the slab optical waveguide.

15. The method of manufacturing an optical module according to claim 14, wherein the mounting step is performed so that an intensity of the light exiting from the severed surface reaches its maximum.

16. The method of manufacturing an optical module according to claim 13, wherein the aligning step includes
entering the light to the input channel optical waveguides of one of the optical waveguide substrates,
entering the light exiting from a severed surface of a slab optical waveguide portion of said one of the optical waveguide substrates to a severed surface of a slab optical waveguide portion of another optical waveguide substrate, and
monitoring the light exiting from the output channel optical waveguides of said another optical waveguide substrate.

17. The method of manufacturing an optical module according to claim 16, wherein the aligning step is performed so that the intensity of the light exiting from the output channel optical waveguides reaches its maximum.

18. The method of manufacturing an optical module according to claim 9, wherein the plurality of optical waveguide substrates are formed so that each optical waveguide substrate includes a flat surface and a projection, each flat surface being provided consecutively with the end surface, which is an adhesion surface, each projection projecting from a surface of the corresponding optical waveguide substrate;
wherein the end surfaces of the plurality of optical waveguide substrates and flat surfaces of the projections are adhered to each other with the optical adhesive.

19. The method of manufacturing an optical module according to claim 9, wherein the optical adhesive has a transmittance of at least 90%.

20. The method of manufacturing an optical module according to claim 9, wherein the optical adhesive has a refractive index of approximately 1.46 D.

* * * * *